[19] United States Patent
Falk et al.

[11] 4,217,427
[45] Aug. 12, 1980

[54] POLYBUTYLENE TEREPHTHALATE-POLYSTYRENE COPOLYMERS

[75] Inventors: John C. Falk; James Wyatt, both of Chicago, Ill.

[73] Assignee: Borg-Warner Corporation, Chicago, Ill.

[21] Appl. No.: 35,366

[22] Filed: May 2, 1979

[51] Int. Cl.$^2$ ............................................. C08L 67/02
[52] U.S. Cl. ................................. 525/176; 525/177; 525/445
[58] Field of Search ................... 525/176, 177, 445

[56] References Cited

U.S. PATENT DOCUMENTS

| | | | |
|---|---|---|---|
| 3,402,219 | 9/1968 | Hill et al. | 525/176 |
| 3,598,882 | 8/1971 | Brinkmann | 525/177 |
| 3,644,574 | 2/1972 | Jackson et al. | 525/176 |
| 3,657,389 | 4/1972 | Caldwell et al. | 525/176 |
| 3,786,116 | 1/1974 | Milkovich et al. | 525/191 |
| 4,143,094 | 3/1979 | Burzin et al. | 525/176 |

FOREIGN PATENT DOCUMENTS 47-51583  12/1972  Japan ............................. 525/177

*Primary Examiner*—Walter C. Danison
*Attorney, Agent, or Firm*—R. J. Schlott

[57] ABSTRACT

Compositions comprising from 70 to 95 wt % polybutylene terephthalate modified by copolymerizing therewith from 30 to 5 wt % of a diol-terminated polystyrene as pendant chains exhibit marked increase in heat deflection temperature at 264 psi stress, together with an unexpected increase in melt flowability.

2 Claims, No Drawings

POLYBUTYLENE TEREPHTHALATE-POLYSTYRENE COPOLYMERS

BACKGROUND OF THE INVENTION

This invention relates to copolymers of polybutylene terephthalate which have an improved 264 psi heat deflection temperature. More specifically, this invention relates to polybutylene terephthalate having incorporated therein side chains of polystyrene and to a method for increasing the heat deflection temperature of polybutylene terephthalate.

Polybutylene terephthalate (PBT) is a crystalline polyester having good strength and toughness, good chemical and abrasion resistance and good electrical properties. The resin is readily injection moldable and finds wide application in the electrical and automotive fields. Unfilled PBT has a very high heat deflection temperature at low levels of stress. With increased stress levels, the heat deflection temperature of unfilled PBT drops sharply and parts molded from unfilled PBT cannot be employed at temperatures much above 100° F. where significant stress levels will be encountered.

Reinforcement of PBT with glass fibers enhances the high temperature properties of PBT, increasing the 264 psi heat deflection temperature from 130° F. for the unfilled resin to 415° F. for glass fiber-filled PBT. Addition of glass fiber also increases such mechanical properties as tensile strength and modulus and lowers overall elongation. PBT has a sharp crystalline melting point of 435° F. and is readily processed at melt temperatures above 450° F. This good flowability of PBT permits rapid injection molding at moderate injection pressures even with large and intricate molds. The addition of fillers such as glass fiber generally decreases flowability while increasing the heat deflection temperature of PBT. Additionally, the use of glass fiber fillers in some applications such as in film and filament extrusion is not generally desirable.

A method for improving the high stress heat deflection temperature of PBT without detrimentally affecting the otherwise excellent processing characteristics of PBT would increase the range of potential end uses for unfilled PBT.

SUMMARY OF THE INVENTION

Polybutylene terephthalate having incorporated therein pendant side chains of polystyrene exhibits a markedly higher heat deflection temperature than unmodified polybutylene terephthalate. Mechanical properties other than heat deflection temperature are not significantly affected, while melt flow characteristics are substantially improved by the incorporation of styrenic side chains into the butylene terephthalate polymer chain.

DETAILED DESCRIPTION OF THE INVENTION

Polybutylene terephthalate is generally prepared commercially by a polycondensation reaction of dimethyl terephthalate and 1,4 butanediol. For the purposes of this invention the PBT is modified to include polystyrene segments as pendant side chains. Modification of polybutylene terephthalate is accomplished by including a substituted ethylene glycol having the structure:

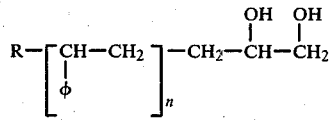

wherein R is selected from the group hydrogen and lower alkyl and n is a positive integer greater than 1. Generally n will have a value such that the polymeric portion will have a molecular weight in the range of from about 5000 to 50,000; i.e., n will be from about 50 to about 500. The polystyrene-substituted ethylene glycol will be more accurately viewed as a diol-terminated polystyrene chain.

The proportion of diol-terminated polystyrene incorporated in the polybutylene terephthalate will be from about 5 to about 50 percent by weight of total polymer, and preferably from about 5 to about 25 percent by weight. At low levels of incorporation of diol-terminated polystyrene the effect on heat deflection temperature will be vanishingly small, while at levels above about 25 wt % and particularly for levels at and above about 50 wt % the mechanical properties of the polybutylene terephthalate become markedly altered by the presence of high levels of polystyrene.

Diol-terminated polystyrene is readily prepared by terminating the chain growth of an anionic styrene polymer with epichlorohydrin to produce an epoxide-terminated polystyrene, followed by hydrolysis of the epoxide group to provide diol functionality at the end of the polystyrene chain. Methods for carrying out the polymerization, epichlorohydrin termination and epoxide hydrolysis steps are more fully described and set forth in U.S. Pat. No. 3,786,116.

The practice of this invention will be more fully understood by consideration of the following illustrative examples.

EXAMPLE 1

Preparation of Diol-terminated Polystyrene. To a solution of 0.2 ml of diphenyl ethylene in 2500 ml of dry benzene under an inert gas atmosphere was added dropwise a 12% solution of n-butyl lithium in hexane until a light reddish color persisted. An additional 8 ml of n-butyl lithium was then added followed by 416 grams of styrene monomer. A temperature of 40° C. was maintained throughout by external cooling. The polymerization was continued at 40° C. for thirty minutes after the addition of styrene monomer. The reaction mass was cooled, and the anionic living polystyrene was terminated by treatment with 1 gram of epichlorohydrin. The resulting epoxide-terminated polymer was isolated by coagulation with methanol and dried in a vacuum oven.

The polymer, 410 grams, was then dissolved in 200 ml of tetrahydrofuran, and the solution was diluted with 200 ml of water. Sufficient dilute sulfuric acid was added to adjust the pH to 2. The mixture was stirred at 65° C. for 8 hours to hydrolyze the epoxy groups. The product diol-terminated polystyrene was coagulated by pouring into hot water, collected by filtration and dried in a vacuum oven.

The diol-terminated polystyrene was further purified by dissolving in methylene chloride, filtering through diatomaceous earth, reprecipitating with methanol and vacuum drying the white, powdery polymer. The diol-terminated polystyrene had a number average molecular weight of 34,000.

EXAMPLE 2

Preparation of Polybutylene Terephthalate Containing Diol-terminated Polystyrene In a resin flask were placed 194.2 grams of dimethyl terephthalate, 180.4 gram of 1,4 butanediol, 0.66 grams zinc acetate and 0.14 grams $Sb_2O_3$. The mixture was heated under nitrogen for two hours at 140°-150° C. and then for two hours at 250°-260° C., followed by heating for one hour under vacuum (0.5 mm). To the reaction mixture were then added 94.0 grams of the diol-terminated polystyrene of Example 1, and heating under vacuum was continued for an additional 2 hours at 270°-280° C. The reaction mass was cooled and collected as a resinous mass having a specific viscosity of 0.77 at 25° C. (40/60 tetrachloroethylene/phenol). Acetone extraction demonstrated that greater then 99% of the diol terminated polystyrene had been incorporated into the polybutylene terephthalate chain, producing a modified polybutylene terephthalate containing 30 wt % polystyrene as 34,000 molecular weight side chains.

Additional preparations of modified polybutylene terephthalate containing 5 and 15 wt % diol-terminated polystyrene were carried out in the same manner.

Physical tests of the modified polybutylene terephthalate were carried out. The test data are summarized in Table 1.

minated polystyrene can increase the 264 psi heat deflection temperature of PBT by as much as 37° C. while substantially increasing the processability at temperatures below the crystal melt temperatures is therefore surprising and unexpected.

The invention will thus be seen to be a process for improving the upper use temperature and processability of polybutylene terephthalate by incorporating therein from 5 to 30 wt % of a diol-terminated polystyrene, and a polymeric composition comprising from 70 to 95 wt % polybutylene terephthalate having copolymerized therewith from 30 to 5 wt % of a diol terminated polystyrene.

We claim:

1. A composition comprising from 70 to 95 wt % polybutylene terephthalate and from 30 to 5 wt % of a diol-terminated polystyrene having the formula:

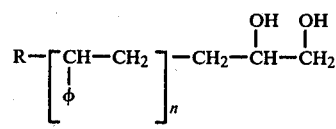

wherein R is selected from the group consisting of lower alkyl and H and wherein n is an integer of from 50 to 500, copolymerized therewith.

2. A method for increasing the 264 psi heat deflection temperature of polybutylene terephthalate consisting of copolymerizing therewith from 5 to about 30 wt %, Table 1

| Ex No. | Polymer | $\eta sp/c^{(1)}$ | HDT[2] (°C.) | Izod[3] Impact | Tensile Str.(psi) | E % | Flex Mod. (psi × 10−5) | Melt Flow[4] (cc/10min) |
|---|---|---|---|---|---|---|---|---|
| 3 | PBT/15PS[5] Copolymer | 0.77 | 89 | 0.5 | 5950 | <5 | 3.58 | 159°/430° F. |
| 4 | PBT/5PS[5] Copolymer | 0.78 | 64 | 0.2 | brittle | — | 4.05 | no flow/430° F. |
| 5 | PBT[6] Control | 0.80 | 52 | 0.6 | 7580 | <5 | 3.97 | no flow/430° F. |
| 6 | PBT[6] Control | 0.83 | 42 | 0.3 | 9020 | 8 | 3.73 | no flow/430° F. |
| 7 | 85PBT/15PS[7] Blend | — | 67 | 0.2 | brittle | — | 3.75 | no flow/430° F. |

Notes:
[1]$\eta sp/c$ at 25° C., 40/60 tetrachloroethylene/phenol
[2]HDT at 264 psi
[3]Izod Impact, ft lbs/in notch
[4]Single Point Rheometry by Monsanto Rheometer, L/D = 20/1, at 40 psi
[5]Modified copolymers of polybutylene terephthalate containing 15 wt % (Ex 3) and 5 wt % (Ex 4) diol-terminated polystyrene--See Ex 2
[6]PBT controls: Ex 5 prepared by process of Ex 2; Ex 6 commercial PBT from Celanese
[7]Blend of 85 parts polybutylene terephthalate of Ex 5 and 15 parts of polystyrene having 26000 MW
[8]All test samples compression molded It will be apparent from the data for Example 3 that the heat deflection temperature is markedly increased over that of PBT (Examples 5 and 6) by the incorporation of 15 wt % diol-terminated polystyrene. At the lower level of 5 wt %, Example 4, some increase in HDT was noted. That this effect does not result from mere blending will be seen from the data for Example 7, wherein the incorporation of polystyrene in a blend with PBT results in a brittle material.

Flow properties of the copolymer containing 15 wt % diol-terminated polystyrene are surprisingly good at 430° F., as compared with that of the PBT controls and with that of the blend. PBT is normally processed at temperatures above the crystal melting point of 453° F., and the observation that the incorporation of diol-terbased on final copolymer, of a diol-terminated polystyrene of the formula:

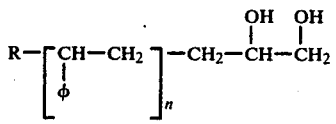

wherein R is selected from the group lower alkyl and hydrogen and wherein n is a positive integer between 50 and 500.

* * * * *